(12) United States Patent
Nemoto

(10) Patent No.: US 9,174,568 B2
(45) Date of Patent: Nov. 3, 2015

(54) HEADLAMP MOUNTING BRACKET ENERGY ABSORBER

(71) Applicant: SABIC Innovative Plastics IP B.V., Bergen op Zoom (NL)

(72) Inventor: Takaaki Nemoto, Mishima (JP)

(73) Assignee: SABIC GLOBAL TECHNOLOGIES B.V. (NL)

(*) Notice: Subject to any disclaimer, the term of this patent is extended or adjusted under 35 U.S.C. 154(b) by 360 days.

(21) Appl. No.: 13/927,607

(22) Filed: Jun. 26, 2013

(65) Prior Publication Data

US 2015/0003101 A1    Jan. 1, 2015

(51) Int. Cl.
```
B60Q 1/04      (2006.01)
F21S 8/10      (2006.01)
F21V 7/04      (2006.01)
B60R 21/34     (2011.01)
```

(52) U.S. Cl.
CPC ............ *B60Q 1/0483* (2013.01); *B60Q 1/0491* (2013.01); *B60R 21/34* (2013.01); *F21S 48/10* (2013.01); *F21S 48/30* (2013.01); *B60R 2021/343* (2013.01)

(58) Field of Classification Search
None
See application file for complete search history.

(56) References Cited

U.S. PATENT DOCUMENTS

| | | | |
|---|---|---|---|
| 5,741,446 A * | 4/1998 | Tahara et al. | 264/1.9 |
| 6,471,386 B2 | 10/2002 | Oh | |
| 6,695,396 B1 | 2/2004 | Schwab | |
| 7,029,154 B2 | 4/2006 | Arlon et al. | |
| 7,156,545 B2 | 1/2007 | Arlon | |
| 2002/0122312 A1 | 9/2002 | Berne et al. | |
| 2006/0146556 A1 | 7/2006 | Arlon et al. | |
| 2007/0139948 A1* | 6/2007 | Rawlings et al. | 362/548 |
| 2012/0112479 A1* | 5/2012 | Nagwanshi et al. | 293/133 |

FOREIGN PATENT DOCUMENTS

| | | | |
|---|---|---|---|
| DE | 102006007449 A1 | 8/2007 | |
| EP | 0807547 A1 | 11/1997 | |
| EP | 1400405 A1 | 3/2004 | |
| EP | 1577610 A1 | 9/2005 | |

(Continued)

OTHER PUBLICATIONS

International Search Report for International Application No. PCT/IB2014/062543; International Filing Date: Jun. 23, 2014; Date of Mailing: Oct. 28, 2014.

(Continued)

*Primary Examiner* — Ashok Patel
(74) *Attorney, Agent, or Firm* — Cantor Colburn LLP

(57) ABSTRACT

The present disclosure is directed a thermoplastic energy absorbing headlamp mounting bracket comprising a frame having a proximal end and a distal end, and an energy absorbing member having a proximal end affixed to the proximal end of the frame, a distal end extending at least partially over the distal end of the frame, and an arcuate central portion extending between the distal end and the proximal end of the energy absorbing member. The proximal end of the energy absorbing member is configured to operably couple to a portion of the headlamp, and the frame is frictionally slidable in relation to the distal end of the energy absorbing member. Headlamps and vehicles comprising the energy absorbing headlamp mounting bracket are also disclosed.

24 Claims, 7 Drawing Sheets

(56) References Cited

FOREIGN PATENT DOCUMENTS

| | | | |
|---|---|---|---|
| FR | 2844755 | A1 | 3/2004 |
| FR | 2911824 | A1 | 8/2008 |
| JP | 11165581 | A | 6/1999 |
| JP | 2000280816 | A | 10/2000 |
| JP | 2004203288 | A | 7/2004 |
| JP | 2004207061 | A | 7/2004 |
| JP | 2004338510 | A | 12/2004 |
| JP | 2005145271 | A | 6/2005 |
| JP | 2005280415 | A | 10/2005 |
| JP | 2007076568 | A | 3/2007 |
| JP | 2007090916 | A | 4/2007 |
| KR | 20030039460 | A | 5/2003 |

OTHER PUBLICATIONS

Machine Translation of EP0807547; Publication Date: Nov. 19, 1997; 12 Pages.
Machine Translation of EP1400405; Publication Date Mar. 24, 2004; 16 Pages.
Machine Translation of FR2911824; Publication Date: Aug. 1, 2008; 12 Pages.
Machine Translation of KR20030039460; Publication Date: May 22, 2003; 10 Pages.
Written Opinion of the International Searching Autority for International Application No. PCT/IB2014/062543; International Filing Date: Jun. 23, 2014; Date of Mailing: Oct. 28, 2014.

* cited by examiner

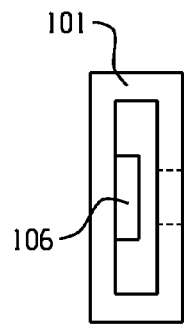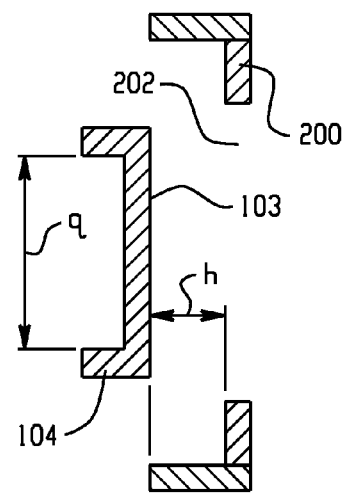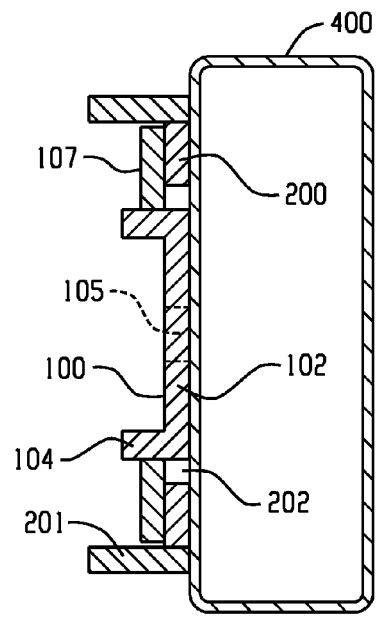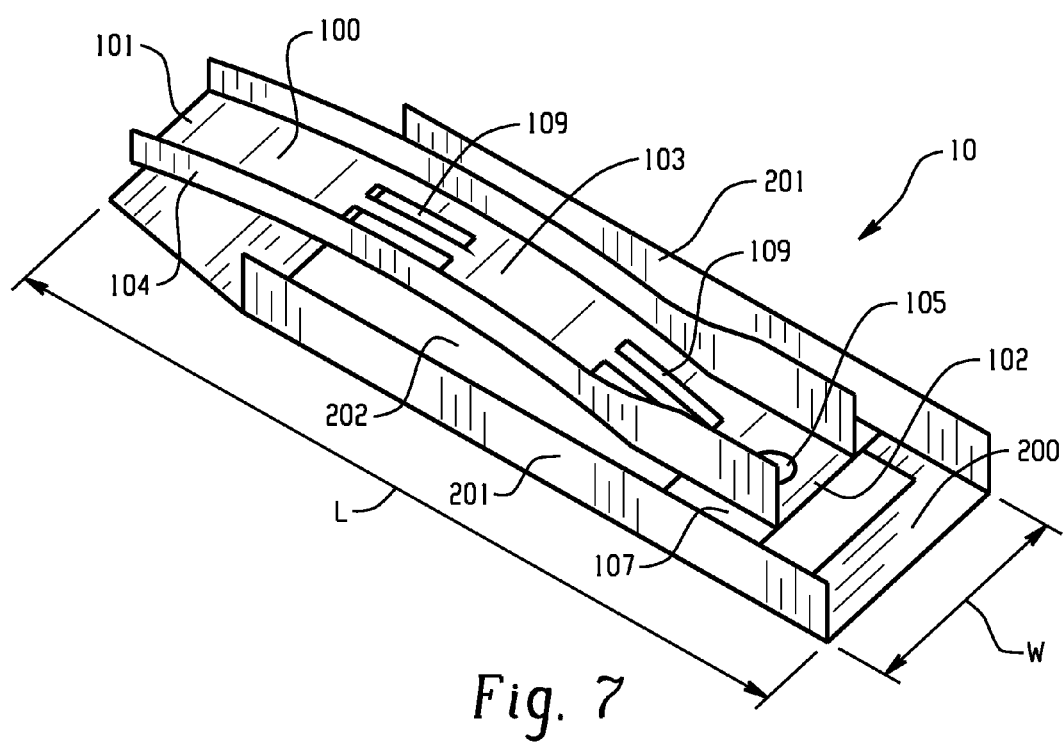
Fig. 4   Fig. 5   Fig. 6
Fig. 7

HEADLAMP MOUNTING BRACKET ENERGY ABSORBER

BACKGROUND

The present disclosure relates generally to thermoplastic energy absorbing elements that can be used in a vehicle to reduce injuries and/or minimize damage to the vehicle.

Increased importance has been placed recently on methods for minimizing the amount of injury suffered by pedestrians in an accident as well as for mitigating vehicle damageability. Globally, different regulatory committees have been established to assess automotive, pedestrian, and occupant performance during impact. Depending on the overall performance, vehicles are assigned a cumulative safety rating. Each and every component of the vehicle needs to satisfy specific impact criteria in order to ensure a good overall rating for the vehicle. Therefore, the various governmental regulatory bodies, the automotive industry, as well as the original equipment manufacturers (OEM's) are all continually seeking economic solutions to improve the overall safety rating of vehicles.

Due to their location at the front and/or the corners of the vehicle, headlamps have an important function in the passive safety of vehicles, particularly with respect to pedestrians. The headlamps of the vehicle are one of the locations most contacted by a pedestrian in an impact between the pedestrian and the vehicle. Similarly, headlamps are primary locations damaged in an impact with another vehicle. Several designs have been proposed for minimizing pedestrian injury during an impact, and for simultaneously minimizing damage to the headlamps or headlights themselves. Some of these designs require significant structural modifications to the headlamp which also increase its volume (e.g. necessary packaging space), weight, and/or cost. Other designs require structural modification to the chassis surrounding the headlamp area.

Generally, headlamps are provided as a single assembly, comprising a lens, housing, a light source, a bezel, and a reflector. As a result, even under circumstances where very limited damage to any component of the headlamp assembly occurs, the entire assembly may have to be replaced with a new one. This results in a high replacement or maintenance cost. As a result, there is a need to design a headlamp incorporating energy absorption elements that will deform and absorb kinetic impact energy to both minimize pedestrian injury, and mitigate vehicle damageability, thereby ensuring good vehicle safety rating.

In addition, there is also a need to reduce replacement and maintenance costs, particularly costs associated with low impact energy incidents. A product and/or method that reduces or eliminates damage to a component of an impacted vehicle, and which thereby reduces the need to replace that component, are therefore desired.

SUMMARY

Disclosed, in various embodiments, are energy absorbing devices that can be used in conjunction with various vehicle components. In particular, disclosed herein are thermoplastic energy absorbing headlamp mounting brackets for a headlamp capable of reducing injuries to a pedestrian or an occupant of a vehicle following impact and/or vehicle damage.

The present disclosure is directed to a thermoplastic energy absorbing headlamp mounting bracket comprising a frame having a proximal end and a distal end, and an energy absorbing member having a proximal end affixed to the proximal end of the frame, a distal end extending at least partially over the distal end of the frame, and an arcuate central portion extending between the distal end and the proximal end of the energy absorbing member. The proximal end of the energy absorbing member is configured to operably couple to a portion of the headlamp, and the frame is frictionally slidable in relation to the distal end of the energy absorbing member.

The foregoing and other features will be more readily apparent from the following detailed description and drawings of the illustrative embodiments.

BRIEF DESCRIPTION OF THE DRAWINGS

The features of the energy absorbing system for vehicle bumpers described; will become apparent from the following detailed description when read in conjunction with the drawings wherein like parts are designated with like, primed reference numbers throughout in which:

FIG. 4 is a front view perspective of the energy absorbing headlamp mounting bracket at the proximal end;

FIG. 5 is a rear view perspective of the energy absorbing headlamp mounting bracket at section A-A of FIG. 1;

FIG. 6 is a rear view perspective of the energy absorbing headlamp mounting bracket at section B-B of FIG. 1;

FIG. 7 is an isometric top left view of the energy absorbing headlamp mounting bracket;

DETAILED DESCRIPTION

Figure 1:
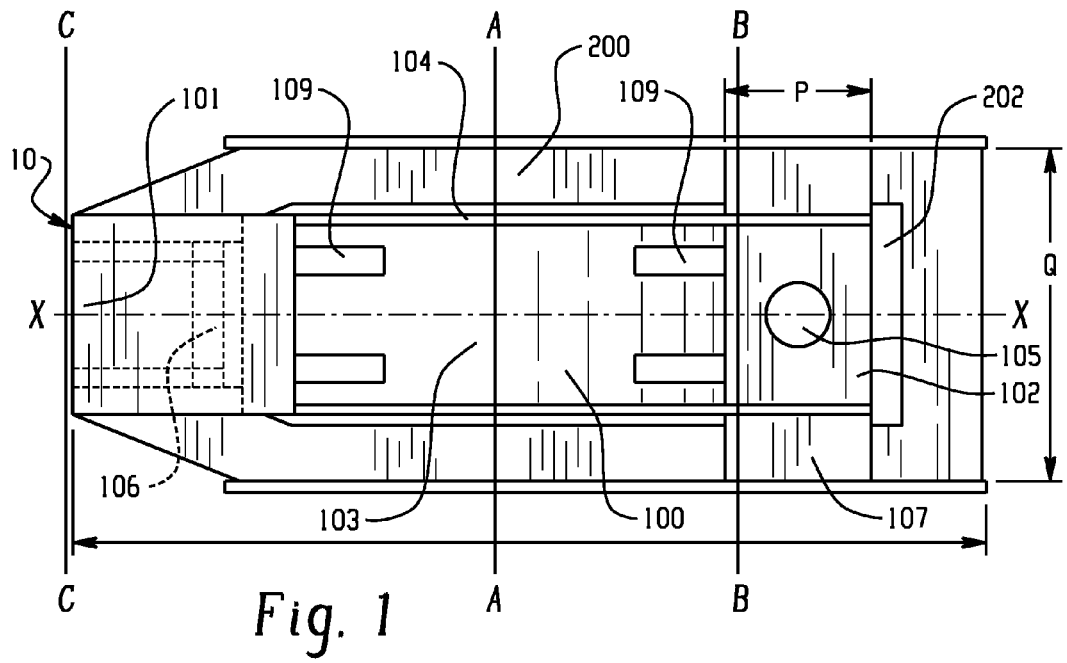
FIG. 1 is an illustration showing a top view of an embodiment of the energy absorbing headlamp mounting bracket.

Disclosed, in various embodiments, are thermoplastic energy absorbing mounting brackets for a headlamp which can be used to absorb energy when a headlamp is impacted by a pedestrian, another vehicle, or by another external impact source, thereby minimizing damage inflicted as a consequence of the impact. For example, the energy absorbing headlamp mounting brackets are capable of reducing injuries incurred by a pedestrian during impact. In addition, the energy absorbing mounting brackets are also capable of minimizing damage to the vehicle, in particular the headlamps themselves, during impact.

The energy absorbing headlamp mounting bracket can be located in a position that most effectively enables the energy absorbing mounting bracket to deform and absorb kinetic impact energy. For example, the energy absorbing headlamp mounting brackets can be positioned between the headlamp and a component of the vehicle which acts as a support for the headlamp (e.g. between the headlamp and its support). The energy absorbing mounting bracket can be directly attached to the vehicle headlamp and/or the support component of the vehicle, and can optionally be demountable (e.g. removable) from the vehicle.

In some embodiments, the energy absorbing headlamp mounting bracket can be removably attached to the headlamp and/or the body component of the vehicle in a manner such that the energy absorbing mounting bracket can be removed from the vehicle without damaging either the headlamp or the support to which it is attached. During an impact at the location of the headlamp, the impact energy can be absorbed by the energy absorbing headlamp mounting bracket, thereby protecting the vehicle headlamp, the pedestrian, and/or the occupant(s) of the vehicle. Absorption of impact energy by the energy absorbing headlamp mounting bracket can lead to deformation of the mounting bracket. However, since the energy absorbing headlamp mounting bracket can be separately demountable from the vehicle headlamp, after the impact, the energy absorbing headlamp mounting bracket can be replaced separately from the headlamp if the headlamp has not incurred significant damage or, alternatively, as a part of the headlamp. That is, the entire headlamp does not need to be replaced merely because the energy absorbing headlamp mounting bracket has been deformed due to the absorption of energy (e.g., plastically deformed).

At low speed impact, the energy absorbing headlamp mounting brackets are capable of reducing vehicle damage by managing kinetic impact energy and intrusion while simultaneously not exceeding the load limit of the headlamp housing to which they are coupled. Without being limited by theory, it is believed that absorption of the energy is managed by converting kinetic energy to elastic energy through the bending of the energy absorbing member, and/or by converting the kinetic energy to heat. The conversion of kinetic energy to heat can occur through friction of the frame of the energy absorbing mounting bracket, positioned between the vehicle support and the distal end of the energy absorbing member which extends over at least a portion of the frame.

By providing a thermoplastic energy absorbing headlamp mounting bracket, where the bracket comprises an energy absorbing member and a frame, significant savings in weight, maintenance times, and assembly times can be achieved.

Accordingly, disclosed herein in various embodiments, is a thermoplastic energy absorbing headlamp mounting bracket comprising a frame having a proximal end and a distal end, and an energy absorbing member having a proximal end and a distal end. The proximal end of the energy absorbing member is affixed to the proximal end of the frame, while the distal end of the energy absorbing member has portions extending at least partially over the distal end of the frame. The distal end of the energy absorbing member extends laterally (e.g. to the side), or in other words, flares sideways perpendicular to its longitudinal axis to at least partially cover a portion of the frame. The energy absorbing member further comprises an arcuate central portion extending between the distal end and the proximal end of the energy absorbing member. The proximal end of the energy absorbing member is configured to operably couple to a portion of the headlamp and the distal end of the energy absorbing member is configured to operably couple to a vehicle support component. The energy absorbing headlamp mounting bracket is further designed such that the frame is frictionally slidable in relation to the distal end of the energy absorbing member and to the vehicle support component (e.g. the vehicle's chassis).

The energy absorbing headlamp mounting bracket can be tuned to absorb energy and deform either elastically (i.e. reversibly) or plastically (i.e. irreversibly) during impact with a pedestrian, another vehicle, or with another external impact source. External work done, for example by compression of the energy absorbing member following impact, causes the arcuate central portion of the energy absorbing member to deflect from its unstressed state, and can be transformed into strain energy, where strain energy refers to a form of potential energy. The strain energy, stored in the form of elastic deformation can be recoverable in the form of mechanical work that can be used to restore the headlamp to its original, pre-impact position. For an energy absorbing member having a fixed distal end, the strain energy may be described by Equation (1):

$$U = \int \frac{M^2 dy}{2EI} \quad \text{(Equation 1)}$$

where:
U is the strain energy in Joules (J);
M is the Moment in Newton meters (Nm);
dy is the change in position of the proximal end of the energy absorbing member in meters (m)(i.e. the depth of intrusion);
E is Young's modulus of the energy absorbing member in Newtons per meter squared (N/m$^2$); and
I is the angular moment of inertia in Nm$^2$ and is equal to (Wt$^3$/12),
where W is the width of the energy absorbing member and t is its thickness (both in meters).

In addition, kinetic energy resulting from an impact between a pedestrian or a vehicle and the headlamp can be absorbed by the energy absorbing headlamp mounting bracket through thermodynamic irreversibility, or in other words, by converting the kinetic energy to heat. This conversion of kinetic energy can occur through friction of the frame sandwiched between the vehicle support, such as the vehicle's chassis, and the distal end of the energy absorbing member extending over at least a portion of the frame. For a frame frictionally slidable and sandwiched between the energy absorbing member and the vehicle component to which the energy absorbing member is coupled, the kinetic energy lost due to friction may be described by Equation (2):

$$E_{th} = \mu_k \int f(x) dx \qquad \text{(Equation 2)}$$

where $E_{th}$ is the energy lost in Joules;

$\mu_k$ is the kinetic friction coefficient between the frame, the vehicle support component, and the distal end of the energy absorbing member extending over a portion of the frame (dimensionless); and x is the distance traveled by the frame in m (i.e. the depth of intrusion).

To initiate movement, the force exerted by the impact ($F_i$) on the headlamp can be equal to, or larger than, the product of the friction coefficient and the normal force ($F_n$) exerted by the distal end of the energy absorbing member on the frame sandwiched between the distal end of the energy absorbing member and the vehicle component to which the energy absorbing member is coupled ($F_i \geq \mu F_n$).

For example, under unstressed conditions, the static friction coefficient ($\mu_s$) of the frame of the energy absorbing headlamp mounting bracket sandwiched between the energy absorbing member on one side and the vehicle support component on the other side, will prevent the headlamp from compressing (e.g., bending) the energy absorbing member. Upon impact with a pedestrian or another vehicle, a force (e.g., $F_i$) will be applied in parallel with the impact direction. Assuming the impact force exceeds the product of the static friction coefficient between the frame sandwiched between the distal end of the energy absorbing member and the vehicle component to which the energy absorbing member is coupled and the normal force compressing the distal end of the energy absorbing member to the vehicle support component ($F_i \geq F_n \cdot \mu_s$), the headlamp will compress the energy absorbing member, causing it to bend and store strain energy. The strain energy can in turn be used to restore the headlamp to its original position up to the point where the force induced deformation exceeds the Young's modulus of the energy absorbing member. Simultaneously with the bending of the energy absorbing member, the frictionally slidable frame can slide in the direction of the impact, thereby converting the kinetic energy of the impact to heat, and reducing the amount of energy absorbed by the energy absorbing member. Assuming dry friction, in other words, no lubrication between the frame, the vehicle component, and the distal end of the energy absorbing member, the static friction coefficient ($\mu_s$) will generally be approximately the same as the kinetic friction coefficient ($\mu_k$).

The term "frictionally slidable" as described and used herein, refers to any interaction between the frame of the energy absorbing headlamp mounting bracket and either the energy absorbing member distal end, and/or the vehicle support component, which results in non-destructive slippage being allowed to occur between the frame of the energy absorbing mounting bracket and the energy absorbing member, and/or between the frame and the vehicle support component. The slippage occurs when the force resulting from impact on the headlamp is larger than the product of the normal force ($F_n$) and the static friction coefficient ($\mu_s$). Alternatively, the term "frictionally slidable" refers to an interaction between the frame and the energy absorbing member, and/or between the frame and the vehicle support component, mediated through hydrostatic or hydrodynamic or electrostatic, electrodynamic or magnetic van der Waals, or tribology-related forces.

The energy absorbing headlamp mounting brackets described herein are capable of meeting the lower leg impact and head impact requirements measured according to European New Car Assessment Program (Euro NCAP) Pedestrian testing protocol.

Exemplary characteristics of the energy absorbing headlamp mounting brackets include high toughness/ductility, thermal stability (e.g. −30° C. to 60° C.), high energy absorption efficiency, a good modulus-to-elongation ratio, and recyclability, among others, wherein "high" and "good" are intended to mean that the characteristic at least meets vehicle safety regulations and requirements for the given component/element.

The energy absorbing member and/or the frame in the energy absorbing headlamp mounting brackets can comprise any thermoplastic material or combination of thermoplastic materials that can be formed into the desired shape and provide the desired properties. Exemplary materials include thermoplastic materials as well as combinations of thermoplastic materials with elastomeric materials, and/or thermoset materials. Possible thermoplastic materials include polybutylene terephthalate (PBT); polyethylene terephthalate (PET): acrylonitrile-butadiene-styrene (ABS); polycarbonate (PC) (LEXAN™ and LEXAN™ EXL resins, commercially available from SABIC Innovative Plastics); polycarbonate (PC)/PBT or PC/PET blends (XENOY™ resins, commercially available from SABIC Innovative Plastics); PC/ABS blends (CYCOLOY™ resins, commercially available from SABIC Innovative Plastics); copolycarbonate-polyesters; acrylic-styrene-acrylonitrile (ASA); acrylonitrile-(ethylene-polypropylene diamine modified)-styrene (AES); polyphenylene ether (PPE); PPE/polystyrene (PS) blends (NORYL™ resins, commercially available from SABIC Innovative Plastics); PPE/polyamide blends (NORYL GTX™ resins, commercially available from SABIC Innovative Plastics); polyamides; phenylene sulfide; polyvinyl chloride (PVC); low/high density polyethylene (L/HDPE); polypropylene (PP); expanded polypropylene (EPP); polyethylene and fiber composites; long fiber reinforced thermoplastics (VERTON™ resins, commercially available from SABIC Innovative Plastics) and thermoplastic olefins (TPO), as well as combinations comprising at least one of the foregoing.

An exemplary filled resin is STAMAX™ resin, which is a long glass fiber filled polypropylene resin also commercially available from SABIC Innovative Plastics. Some possible reinforcing materials include fibers such as glass, carbon, and so forth, as well as combinations comprising at least one of the foregoing; e.g., long glass fibers and/or long carbon fiber reinforced resins. The energy absorbing member and/or the frame in the energy absorbing headlamp mounting brackets can also be formed from combinations comprising at least one of any of the above-described materials. For example, in some embodiments, the same material can be used to make each element of the energy absorbing headlamp mounting brackets (e.g. the frame and the energy absorbing member). In other embodiments, different materials can be used to make the various elements of the energy absorbing headlamp mounting brackets (e.g., one material can be used to make the frame and a different material can be used to make the energy absorbing member). It is contemplated that any combination of materials can be used to, e.g., enhance crush characteristics, reduce damageability, etc.

The energy absorbing member and the frame can comprise the same thermoplastic material. Alternatively, the energy absorbing member and the frame can each independently comprise a thermoplastic material that is different from the other.

The energy absorbing headlamp mounting bracket can be manufactured utilizing various molding processes. Examples of molding processes include injection molding, thermoforming, extrusion, or a combination comprising at least one of the foregoing processes. In some embodiments, the energy absorbing headlamp mounting bracket is formed as a single piece assembly in which the energy absorbing member and the frame are integrally formed.

The frame for the energy absorbing headlamp mounting bracket has a proximal end and a distal end. Generally, the proximal end of the frame can be trapezoid-shaped while the distal end of the frame can be rectangular in shape. The length of the frame can be 30 to 140 millimeters (mm), specifically, 50 to 100 mm, more specifically, 60 to 80 mm. If the length is too long, the headlamp would be unsound due to the vibration of the vehicle, and if the length is too short, energy absorption would be insufficient. Likewise, the width of the frame can be 10 to 80 mm for example, specifically, 20 to 60 mm, more specifically, 30 to 50 mm to further improve the vibration stability of the headlamp.

The frame can further include a rectangular shaped opening continuously extending from the large base of the trapezoid at the proximal end, to the top edge defining the rectangular-shaped distal end of the frame. The frame can define an opening where the frame width itself (i.e. excluding the width of the opening) can be 2.0 to 20 mm, specifically, 2.0 to 15 mm, more specifically, 3.0 to 10 mm.

The frame can generally have a length that is longer than the horizontal length of the energy absorbing member. In other words, the distance between the proximal end and the distal end of the frame can be longer than the horizontal distance between the proximal end and the distal end of the energy absorbing member. Additionally, the thickness of the frame in the energy absorbing headlamp mounting bracket can be 1.0 to 6.0 mm, specifically, 1.5 to 5.0 mm, more specifically 2.0 to 4.0 mm.

Also, the frame can have side panels extending at least partially along the length of the frame. For example, the side panels can extend along the length of the frame from the wide base of the trapezoid shape at the proximal end to the distal end of the frame. The side panels can provide stiffness to the frame when the frame is attached at its proximal end to the headlamp housing, thereby stabilizing the headlamp against the vehicle support component. The thickness of the side panels can be, for example, 1.0 to 6.0 mm, specifically, 1.5 to 5.0 mm, more specifically 2.0 to 4.0 mm. In addition, because of the conversion of kinetic energy to heat through friction affected by the frame, the thermoplastic material comprising the frame can have high glass transition temperature ($T_g$), for example, higher than 80° C., specifically higher than 100° C., more specifically, higher than 120° C. The side panels can have thickness that is different than the thickness of the frame. For example, the ratio between the thickness of the frame side panels and the thickness of the frame can be 1.01 to 2.00.

The energy absorbing member in the energy absorbing headlamp mounting bracket can generally have a 'T' shape, with the bottom of the vertical leg of the 'T' defining the proximal end of the energy absorbing member. The proximal end of the energy absorbing member can be configured to couple to the proximal end of the frame, and can also be configured to operably couple to a portion of the headlamp. For example, the proximal end of the energy absorbing member can be operably coupled to the headlamp by snap-fit engaging a housing arm extending from the headlamp housing. The cross bar of the 'T' defines the distal end of the energy absorbing member and can have a generally rectangular shape with the wide aspect extending at least partially over the distal end of the frame of the energy absorbing headlamp mounting bracket. The cross bar of the T-shaped energy absorbing member can have a width of 10 to 80 mm, specifically, 20 to 60 mm, more specifically, 30 to 50 mm.

The junction between the cross bar and the leg of the T-shaped energy absorbing member defines a coupling point. For example, the coupling point can be an aperture, configured to allow operable coupling of the distal end of the energy absorbing member to the vehicle's support component for the headlamp. The vehicle support component can be the chassis, the frame of the vehicle, the engine block, or any other component capable of supporting the headlamp(s).

As used and described, the terms "operably coupled" or "operable coupling" refer to the joining of at least two members directly or indirectly to one another. Such joining may be stationary in nature or moveable in nature. Such joining may be achieved with the at least two members (or the two members and any additional intermediate) being integrally formed as a single unitary body with one another or with the at least two members being attached to one another. Such joining can be permanent in nature or can be removable or releasable in nature.

The arcuate central portion of the energy absorbing member, extends between the proximal end and the distal end of the energy absorbing member, can be generally arcuate in shape. The arcuate central portion can be configured to bend upon impact on the headlamp.

The length of the arc comprising the arcuate central portion of the energy absorbing member can be 25 to 130 mm, specifically, 40 to 90 mm, more specifically, 50 to 75 mm. Likewise, the width of the arcuate central portion can be, for example, 5 to 75 mm, specifically 15 to 65 mm, more specifically, 24 to 45 mm. The thickness of the arcuate central portion can be, for example 1.0 to 6.0 mm, specifically, 2.0 to 5.0 mm, more specifically 3.0 to 4.0 mm.

The arc radius can be used to further optimize (e.g. tune) the degree of bending of energy absorbing member and can be adjusted based on the desired performance. The arc of the arcuate central portion can be defined by a radius of 10 to 300 mm, specifically, 25 to 200 mm, more specifically, 35 to 150 mm. In general, the lower the radius defined by the arcuate central portion, the higher it will rise above the frame of the energy absorbing headlamp mounting bracket.

The height of the arcuate central portion of the energy absorbing member as measured from the bottom of the frame to the center of the arc in the arcuate central portion can be 1 to 20 mm, specifically 2 to 18 mm, more specifically 3 to 15 mm.

The arcuate central portion can additionally have side walls extending along the length of the central portion, adding stiffness to the energy absorbing member without increasing the thickness of the arcuate central portion. The side walls can have a thickness that is different than the thickness of the central arcuate portion of the energy absorbing member. For example, the ratio between the thickness of the side walls of the frame and the frame can be 1.01 to 2.00. The thickness of the side walls can be 1.0 to 6.0 mm, specifically, 2.2 to 5.5 mm, more specifically, 3.2 to 4.2 mm.

Further tuning of the energy absorbing member can be obtained by introducing one or more slits in the arcuate central portion thereby modulating the resiliency of the arcuate central portion. The slits are generally rectangular in shape with the narrow portion of the rectangular shape extending along the length of the arcuate central portion. The optimal number of slits incorporated into the arcuate central portion, and their specific location within the arcuate central portion, can be determined based upon the degree of resiliency desired for the energy absorbing member. For example, the arcuate central portion can include at least one and up to at least six rectangular or oblong slits. In an embodiment, the arcuate central portion comprises four rectangular slits.

The proximal end of the energy absorbing member can be coupled to the proximal end of the frame, and can further comprise a housing configured to operably couple and engage a portion of the headlamp. For example, the energy absorbing member can have a housing comprising a tab configured to engage a complimentary tab on a portion of the headlamp, e.g. a headlamp housing arm, via snap-fit coupling. The thickness of the proximal end can therefore be such that the coupling to the portion of the headlamp can be reversible without compromising the stability of the coupling. For example, the thickness of the proximal end of the energy absorbing member can be 1.5 to 8.0 mm, specifically, 2.0 to 6.0 mm, more specifically, 3.0 to 5.0 mm. Likewise, the height of the proximal end of the energy absorbing member, from the bottom of the frame to the top of the energy absorbing member can be, for example, 1 to 25 mm, specifically, 2.0 to 20 mm, more specifically, 5.0 to 15 mm. The width of the proximal end of the energy absorbing member will generally be similar to the width of the central arcuate portion. However, in some embodiments, the width of the proximal end comprising the portion operably configured to couple to the headlamp housing is not the same as the central arcuate portion, and can be either wider or narrower.

The desired properties for the energy absorbing member can be obtained using a thermoplastic material having, for example, a Young's modulus of 0.8 to 70 GPa, specifically 10 to 50 GPa, more specifically 15 to 30 GPa measured at 23° C. according to ASTM D790. Additionally, the material used for the energy absorbing member can have for example, a Poisson ratio of 0.3 to 0.5, specifically 0.3 to 0.45, more specifically 0.35 to 0.42 measured according to ASTM E-132. The material used for the energy absorber can include PC/PBT blends; PC/PET blends; PC/ABS blends; and PC/ABS blends with impact modifier. The distal end of the energy absorbing member can be coupled to the vehicle support component (i.e. the headlamp support component), for example by using a bolt. A bolt can be used to further tune the performance of the energy absorbing headlamp mounting bracket, by modulating the normal force exerted on the frame sandwiched between the distal end of the energy absorbing member and the vehicle support component. The bolt can be screwed into the vehicle support component with a torque of 50 to 160 Nm, specifically 60 to 120 Nm, more specifically, 70 to 100 Nm. The amount of torque can vary depending upon the screw size.

The specific dimensions of the energy absorbing headlamp mounting bracket can be optimized based on, for example, the energy absorbing requirements for a particular vehicle by a given authority, the characteristic of the headlamp mounted, the vehicle headlamp support component, the number of energy absorbing headlamp mounting brackets used, the location of the energy absorbing headlamp mounting brackets, and the materials used to manufacture the various components of the headlamp and the energy absorbing headlamp mounting brackets. The foregoing is not intended as an all-inclusive list of factors, but rather represents an example of the factors used in choosing the specific spatial, geometrical, structural, and metallurgical configuration parameters used.

The energy absorbing assembly can be produced by several methods such as molding, forming, or any other suitable manufacturing technique. For example, the headlamp mounting bracket can be formed by a process selected from injection molding, thermoforming, extrusion, or combinations comprising at least one of the foregoing.

Provided herein is a headlamp assembly comprising the energy absorbing headlamp mounting bracket. Accordingly, provided herein also is an energy absorbing headlamp mounting bracket for use in a vehicle.

Disclosed herein in various embodiments, is a vehicle comprising a headlamp and a thermoplastic energy absorbing headlamp mounting bracket. The thermoplastic energy absorbing headlamp mounting bracket comprises a frame having a proximal end and a distal end, and an energy absorbing member having a proximal end affixed to the proximal end of the frame, a distal end having portions extending to the side at least partially over the distal end of the frame, and an arcuate central portion extending between the distal end and the proximal end of the energy absorbing member. The proximal end of the energy absorbing member is coupled to a portion of the headlamp, and the distal end of the energy absorbing member is coupled to a support component of the vehicle, and the frame is frictionally slidable in relation to the distal end of the energy absorbing member and the support component of the vehicle.

The energy absorbing headlamp mounting brackets, can be operably coupled to the headlamp at the proximal end of the energy absorbing headlamp mounting bracket and to the vehicle support component at the distal end of the energy absorbing headlamp mounting bracket. The vehicle support component to which the energy absorbing mounting bracket is operably coupled can include the vehicle frame, the chassis, the engine block, and the like. Coupling of the energy absorbing mounting brackets to the headlamp can be, for example, through a headlamp housing arm configured to attach to the proximal end of the energy absorbing mounting bracket. The proximal end of the energy absorbing member can be coupled to the portion of the headlamp by a snap-fit. For example, the housing arm is configured to include a complementary tab which snap-fit engages with the proximal end of the energy absorbing mounting bracket during connection of the housing arm to the energy absorbing mounting bracket.

The overall dimensions of the energy absorbing headlamp mounting brackets will depend upon the number of mounting brackets used for each headlamp, the location of the headlamp in the vehicle, the type of coupling used to attach the headlamp to the vehicle, the coupling geometry on the headlamp housing assembly, as well as the particular vehicle for which the headlamp is intended. For example, the physical dimensions of the energy absorbing headlamp mounting brackets can depend upon the total amount of space available in the desired location of use (e.g. "packaging space") as well as the desired energy absorption profile. In other words the stiffness of the energy absorbing headlamp mounting bracket is dependent upon the size of the packaging space available to accommodate instruction of the headlamp upon impact. In general, the smaller the packaging space available, the stiffer the energy absorbing headlamp mounting bracket.

Similarly, the total number of energy absorbing headlamp mounting brackets used for each headlamp can also vary depending upon the total amount of packaging space available, the desired energy absorption profile, the location of the headlamp in the vehicle, the type of coupling used to attach the headlamp to the vehicle, the coupling geometry on the headlamp housing assembly, as well as the particular vehicle for which the headlamp is intended. Specifically, the number of energy absorbing headlamp mounting brackets can be at least one, specifically, at least two, more specifically, at least three per headlamp.

In an embodiment, the headlamp is coupled to the support member of the vehicle with three energy absorbing headlamp mounting brackets disposed in a triangular configuration.

More specifically, the three energy absorbing headlamp mounting brackets are disposed in a triangular configuration such that the vertex of the triangle is positioned at the top portion of the headlamp.

In an embodiment, when the mounting bracket is fixed to the vehicle support component only at the distal end of the energy absorbing member, an impact with a 9.5 kg impactor at 4.014 m/s at a 34.7 degree angle yields a maximum force equal to or less than 1.5 kN, a bending moment equal to or less than 80 Nm, and kinetic energy equal to or less than 80 J according to EuroNCAP pedestrian testing protocol.

In another embodiment, when the mounting bracket is fixed to the vehicle support component only at the distal end of the energy absorbing member, an impact with a 9.5 kg impactor at 4.014 m/s at a 37.6 degree angle yields a maximum force equal to or less than 1.6 kN, a bending moment equal to or less than 70 Nm and kinetic energy equal to or less than 75 J according to EuroNCAP pedestrian testing protocol.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Turning now to FIG. 1, showing a top view of an embodiment of the energy absorbing headlamp mounting bracket 10 comprising an energy absorbing member 100 and a frame 200. Energy absorbing member 100 has a proximal end 101, a distal end 102 and an arcuate central portion 103 extending between the proximal end 101 and the distal end 102. As shown in FIG. 1, distal end 102 can have extension 107, extending at least partially over frame 200 along section B-B. Also shown in FIG. 1, are sidewalls 104 extending the length of the energy absorbing member 100 from the distal end 102 to the proximal end of the central arcuate portion 103. The proximal end 101 of energy absorbing member 100 can terminate in a housing 108 (not shown) comprising a tab 106 configured to snap-fit engage a complimentary tab in a headlamp housing arm, thereby operably coupling the energy absorbing headlamp mounting bracket to the headlamp. A coupling location 105 is shown in FIG. 1 at the distal end 102 of the energy absorbing member 100. Coupling location 105 is configured to allow the operable coupling of the distal end 102 to the vehicle support component (400, not shown) through the opening 202 in the frame component 200 of the energy absorbing headlamp mounting bracket. As shown in FIG. 1, further tuning of the energy absorbing member 100 can be obtained by introducing slits 108 in the central arcuate portion 103, thereby modulating the resiliency of the arcuate central portion.

Figure 2:
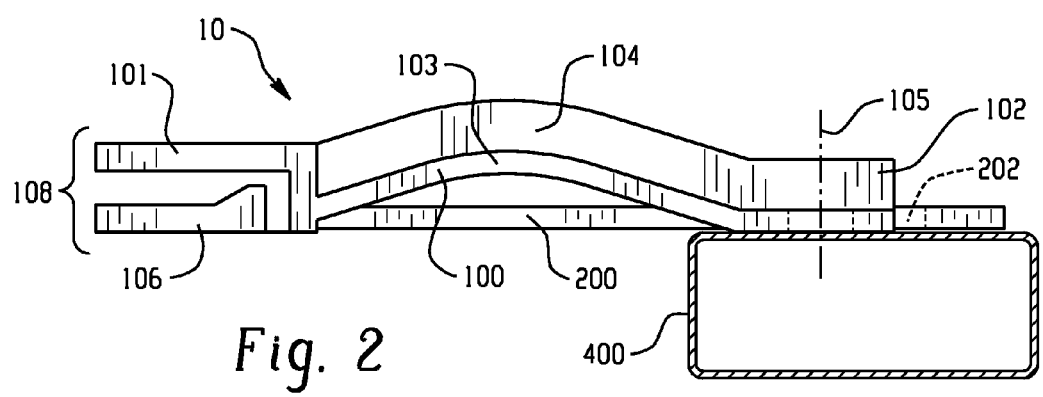
FIG. 2 is an illustration showing a side view of an embodiment of the energy absorbing headlamp mounting bracket.
Figure 3:
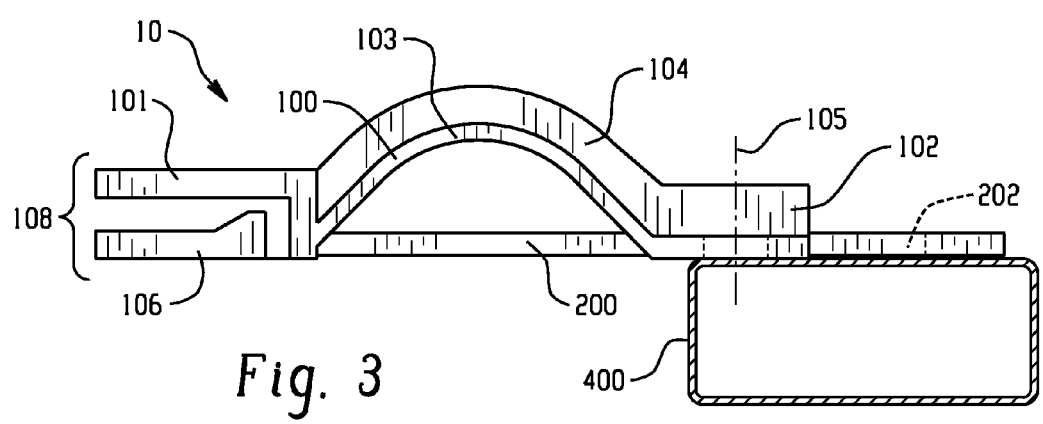
FIG. 3 is an illustration showing a side view of the energy absorbing headlamp mounting bracket following impact.

FIGS. 2 and 3 show a side view of the energy absorbing headlamp mounting bracket taken along section X-X in FIG. 1, under normal, i.e. unstressed circumstances (FIG. 2), and during impact on the headlamp (FIG. 3). As shown in FIG. 2, under unstressed conditions, proximal end 101 of the energy absorbing member defines a housing 108 comprising tab 106 disposed on top of the proximal end of frame 200. Tab 106 is configured to engage a complementary (e.g. having a mirror geometry) tab disposed on a headlamp housing arm (not shown), configured to snap fit by compressing proximal end 101 and tab 106, thus locking in place. Also shown in FIG. 2, is energy absorbing member distal end 102, coupled to the vehicle support component 400 through coupling point 105 disposed within opening 202 of frame 200, and wherein, in this exemplary embodiment, the bottom of distal end 102 of energy absorbing member 100 is in direct contact (i.e. flush) with vehicle component 400. Alternatively, the distal end 102 can be coupled to vehicle component 400 without direct contact. FIG. 2 also shows energy absorbing member side walls 104 extending from distal end 102, along central arcuate portion 103, to the beginning of proximal end 101. Side walls 104 impart stiffness and strength to energy absorbing member 100, without increasing the thickness of energy absorbing member. As shown in FIG. 2, central arcuate portion 103 arcs above frame 200 and is configured to bend with an impact causing a force against the proximal end 101 in the direction of the distal end 102. So long as the force acting on the energy absorbing member 100 is below the threshold load of plastic deformation in the region where any deformation is reversible (in other words before necking occurs), the energy absorbing member 100 will restore the headlamp to its original position.

Turning now to FIG. 3, showing energy absorbing headlamp mounting bracket during an impact, or following deformation of energy absorbing member 100. As shown, upon impact, a force is applied on proximal end 101 which is coupled to a portion of the headlamp housing (not shown). The applied impact force causes the energy absorbing member 100 to bend at the arcuate central portion 103, including, in those embodiments containing it; side walls 104. The frame 200, sandwiched between the vehicle support component 400 and the energy absorbing member distal end 102 extending laterally (see FIG. 1) at least partially over frame 200, frictionally slides in the direction from the proximal end 101 to the distal end 102, partially absorbing the kinetic energy produced by the impact.

FIGS. 4-6, show cross sections of the energy absorbing headlamp mounting bracket along sections A-A (FIG. 5), B-B (FIG. 6), and C-C (FIG. 4).

As shown in FIG. 4, proximal end 101 of energy absorbing headlamp mounting bracket 10 (not marked), taken along section C-C of FIG. 1 can have a cross section defining a closed rectangular frame, with tab 106 mated to the bottom of proximal end 101. In other embodiments, tab 106 can be mated to any portion of proximal end 101, and is configured to engage and secure a portion of the headlamp housing, thereby coupling the proximal end 101 of energy absorbing headlamp mounting bracket 10 (not marked).

Turning to FIG. 5, a cross-section taken along section A-A of FIG. 1 shows an example of arcuate central portion 103 of energy absorbing member 101, comprising side walls 104. The arcuate central portion is positioned above frame 200, defining opening 202 that can allow frame 200 to provide the desired rigidity and support to headlamp (not shown), without an overall increase in the weight of the bracket. The width of central arcuate portion 103 and the side walls 104 define a channel having a width q, which can be narrower than the width of opening 202 along the same section (A-A). As shown in FIG. 5, arcuate central portion 103 of energy absorbing member 100, is positioned above frame 200 at a height h in unstressed conditions illustrated in FIG. 2. Height h (or alternatively the arc radius defined by arcuate central portion 103), can be used to further tune the degree of bending of energy absorbing member 100 and can be adjusted based on the desired performance and other requirements as described above.

Turning to FIG. 6, a cross-section taken along section B-B, shows an embodiment of distal end 102 of the energy absorbing headlamp mounting bracket (10, not shown) having side walls 104, where energy absorbing member distal end extensions 107 are coupled to the side walls 104 and extend over at least a portion of frame 200. The bottom of distal end 102 with side walls 104 defines a channel with width q (not shown, see FIG. 5) that is narrower than opening 202 in frame 200 along section B-B, is shown coupled to a vehicle's headlamp support component 400 through coupling point 105, such that the bottom of the distal end 102 is in contact with the vehicle's headlamp support component 400. As shown in FIG. 6, frame 200 is sandwiched between distal end extensions 107, and the vehicle support component 400. Frame 200 also contains side panels 201 extending the length of frame 200 along section X-X (see FIG. 1). Distal end extensions 107 can extend and can come in contact with side panels 201, creating additional areas for friction between frame 200 and energy absorbing member 100. Side panels 201 can provide additional structural integrity to frame 200 that will impart support to the headlamp (not shown) when coupled to the energy absorbing headlamp mounting bracket 10 (not shown). In various embodiments, the bottom of distal end 102 can be coupled to the vehicle's support component in such a way that there is no direct contact between energy absorbing member 100 and the vehicle's support component 400. Rather, the only contact is via a coupling means (e.g. a screw) disposed in coupling location 105 and frame 200.

Turning now to FIG. 7, showing an embodiment of energy absorbing headlamp mounting bracket 10, configured to receive a portion of a headlamp housing. FIG. 7 is an illustration for CAE (Computer Aided Engineering) analysis. The attaching part to the headlamp housing is omitted to simplify the analysis. The proximal end 101 portion is the fixed point to the headlamp housing in CAE analysis. The energy absorbing headlamp mounting bracket 10 can, for example, be directly coupled to an extension of the headlamp as an integral part of the housing. The energy absorbing headlamp mounting bracket 10 includes an energy absorbing member 100 comprising an arcuate portion 103, a distal end 102, and side walls 104 extending the length of energy absorbing member 100. Distal end 102 defines an aperture coupling location 105 configured to receive a coupling means (e.g. a screw) to couple energy absorbing member to the vehicle's headlamp support component (not shown). The arcuate central portion 103 includes slits 108. Distal end extensions 107 extend laterally at least partially over frame 200, containing side panels 201. Frame 200 has length L and width W, the dimensions of which are tunable to the factors described above.

Figure 8:
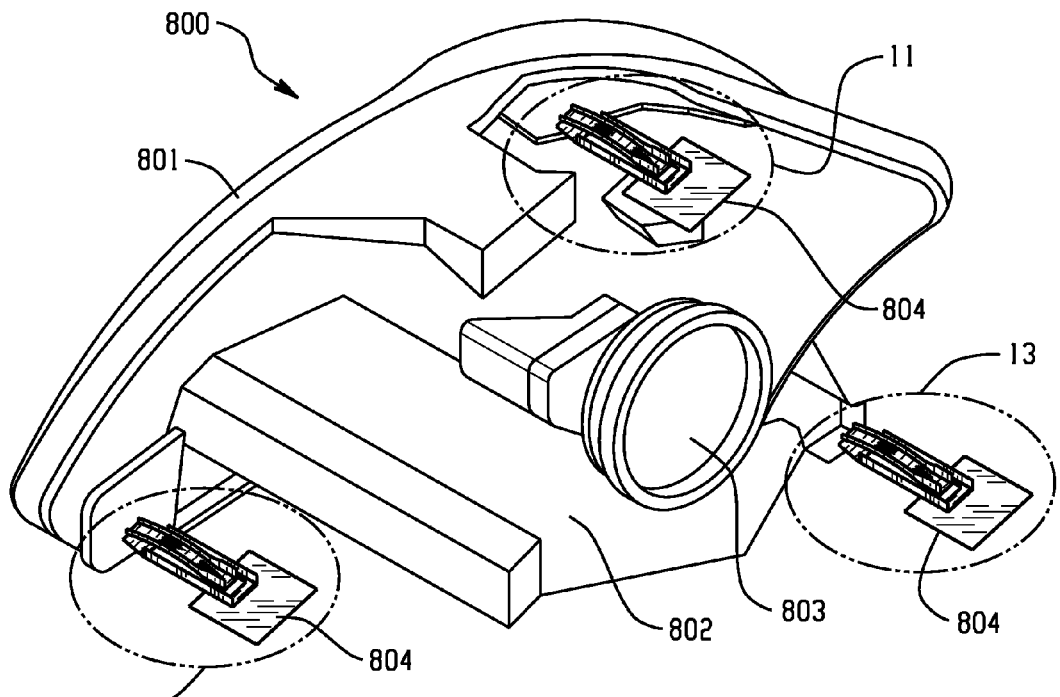
FIG. 8 is an illustration of possible coupling locations for the energy absorbing headlamp mounting bracket to a headlamp.

FIG. 8 illustrates a headlamp assembly 800 comprising a lens 801, a covering housing 802, and an aperture 803 for wiring the headlamp assembly 800. The headlamp assembly further comprises energy absorbing headlamp mounting brackets 11, 12, and 13 having the design as illustrated in FIG. 7, and attached in a triangular configuration to headlamp housing 802. Component 804 illustrates a steel, vehicle support component to which the top 11, bottom left 12, and bottom right 13 energy absorbing headlamp mounting brackets are coupled.

The thermoplastic energy absorbing mounting bracket for a headlamp is further illustrated by the following non-limiting examples.

EXAMPLES

Figures 9, 10:
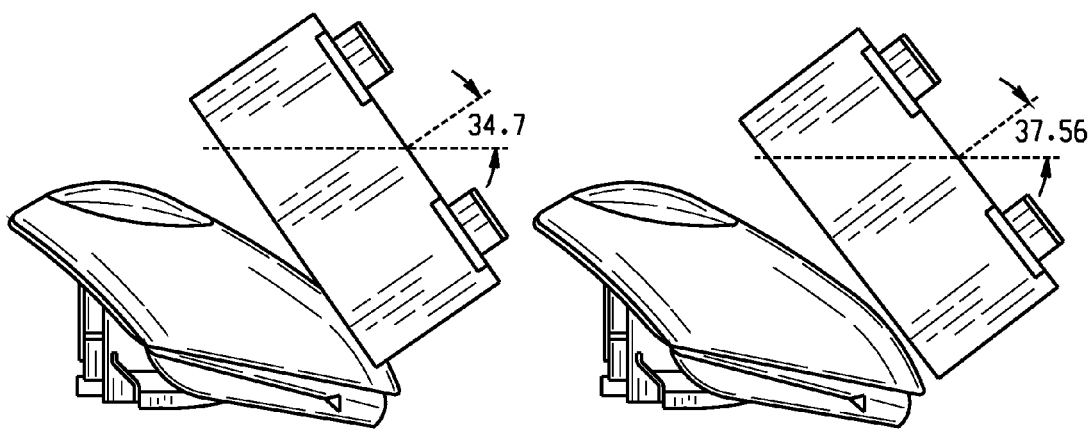
FIG. 9 is an illustration showing the impactor positioned at a 34.7° angle in a low-speed impact pendulum test (pedestrian; Case 1)
FIG. 10 is an illustration showing the impactor positioned at a 37.6° angle in a low-speed impact pendulum test (pedestrian; Case 2)

Simulations by CAE analysis were carried out under the following conditions. The headlamp assembly of FIG. 8, comprising a triad of energy absorbing headlamp mounting brackets as illustrated in FIG. 7, was coupled to the body of a vehicle by three energy absorbing mounting brackets disposed in a triangular configuration with the vertex at the top portion of the headlamp. The energy absorbing mounting brackets were fixed to the body component of the vehicle only at the distal end of the energy absorbing member. The headlamps were tested for upper leg to bonnet leading edge impacts, simulating pedestrian impact, as per EuroNCAP pedestrian testing protocol. To study the effect of incorporating head lamp energy absorbing brackets on upper leg impact performance, only impact cases at headlamp location are included here. A generic vehicle bumper having a mild steel hood, TPO fascia, PC/ABS grille, steel fenders, steel carrier and a headlamp is considered for these studies. The headlamp assembly includes plastic (PC) lens, plastic bezel, plastic (ULTEM) reflector and plastic (PC) housing. An upper legform (e.g., including a femur) impactor weighing 9.5 kilograms (kg) was configured to impact the headlamp assembly at a velocity of 4.014 meters/second (m/s) at an angle of 34.7 degrees as shown in FIG. 9 (hereinafter, case 1), or at a velocity of 4.104 m/s (14.77 kph) at a 37.56 degrees as shown in FIG. 10 (hereinafter, case 2). Measurements of bending moment were done to assess the risk of leg bone fracture, ligament rapture, and the potential for resulting head injury.

Results of the comparison between headlamp assembly using the energy absorbing headlamp mounting bracket shown in FIG. 7, as mounted on a headlamp illustrated in FIG. 8, and a rigid assembly of the same headlamp coupled to the vehicle at the same locations, are shown in Table 1.

Figure 11:
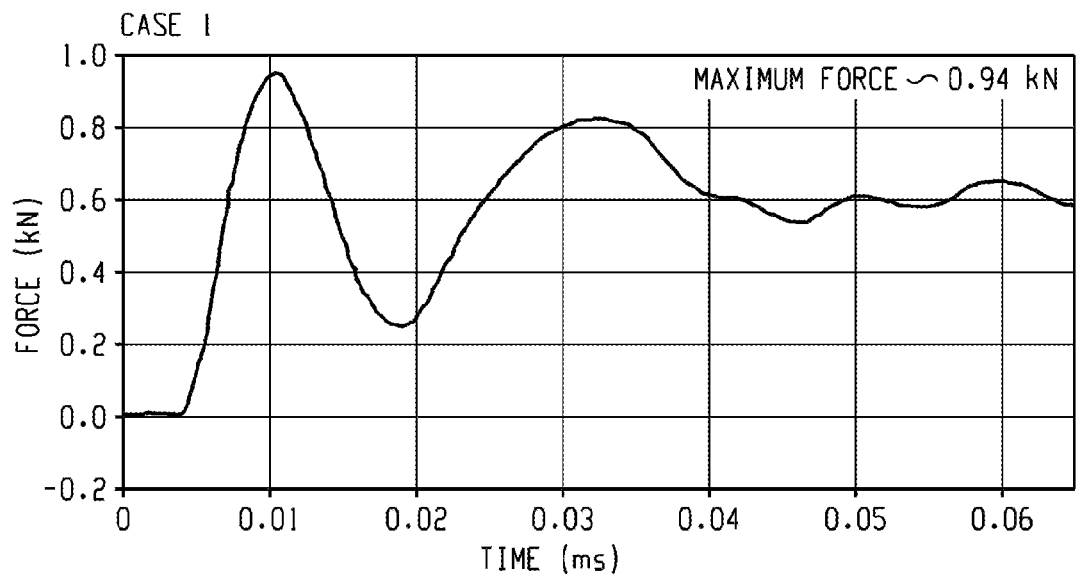
FIG. 11 is a graph showing the maximum force curve on the impactor upon impact based on the low-speed impact pendulum test of FIG. 9 with energy absorbing headlamp mounting bracket.
Figure 12:
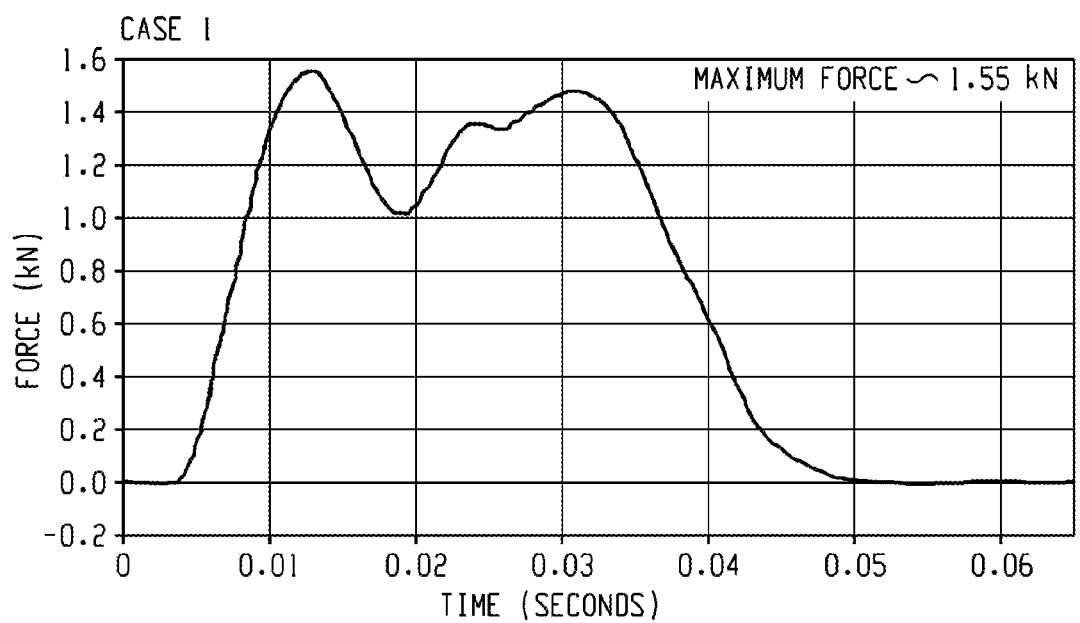
FIG. 12 is a graph showing the maximum force curve on the impactor upon impact based on the low-speed impact pendulum test of FIG. 9 without energy absorbing headlamp mounting bracket.
Figure 13:
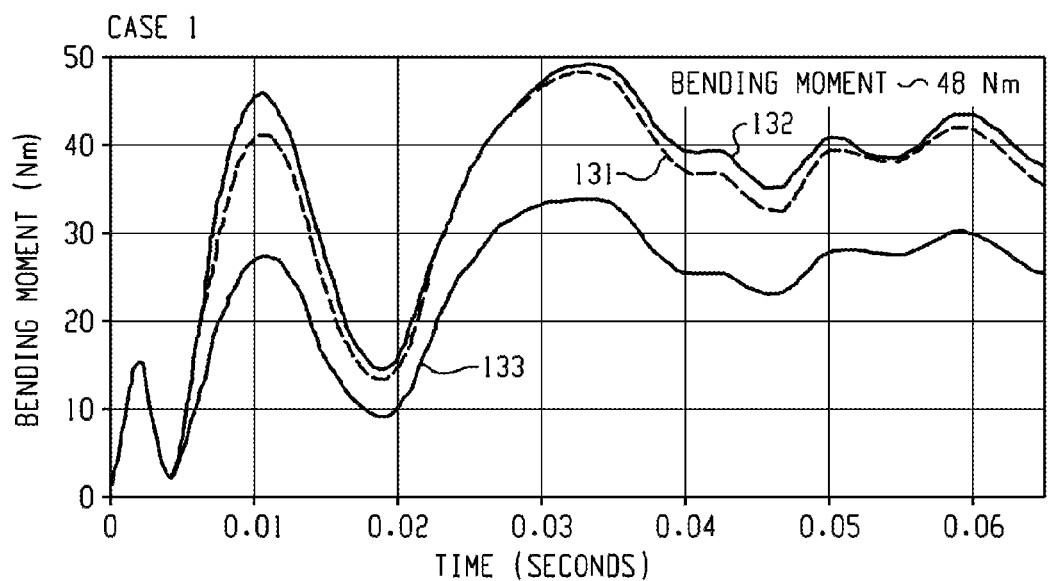
FIG. 13 is a graph showing the bending moment experienced by a headlamp comprising the energy absorbing headlamp mounting bracket upon impact based on the low-speed impact pendulum test of FIG. 9.
Figure 16:
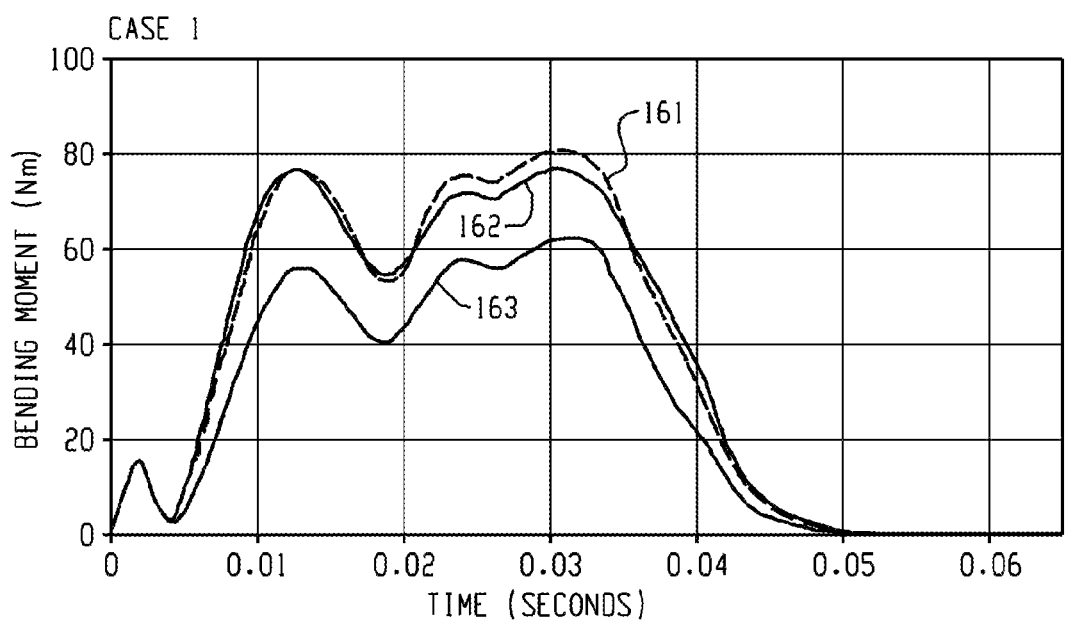
FIG. 16 is a graph showing the bending moment experienced by a headlamp without the energy absorbing headlamp mounting bracket upon impact based on the low-speed impact pendulum test of FIG. 10.

For case-1 (impact angle 34.7 degrees), FIG. 11 shows the measurement of force observed in upper leg-form with respect to time during the impact while the headlamp is connected to a vehicle body through designed energy absorbing brackets. Corresponding measurement of bending moment with respect to time, observed in upper leg-form is shown in FIG. 13. FIG. 12 and FIG. 16 show the results of Force and bending moment values if the headlamp is directly mounted on the vehicle body without using energy absorbing brackets.

Figure 14:
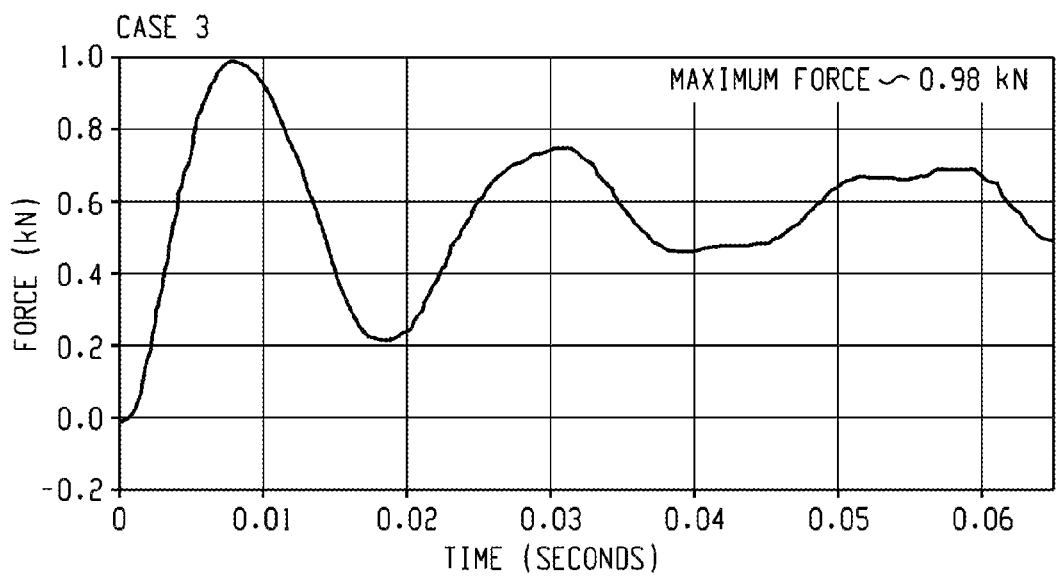
FIG. 14 is a graph showing maximum force curve on the impactor upon impact based on the low-speed impact pendulum test of FIG. 10 with energy absorbing headlamp mounting bracket.
Figure 15:
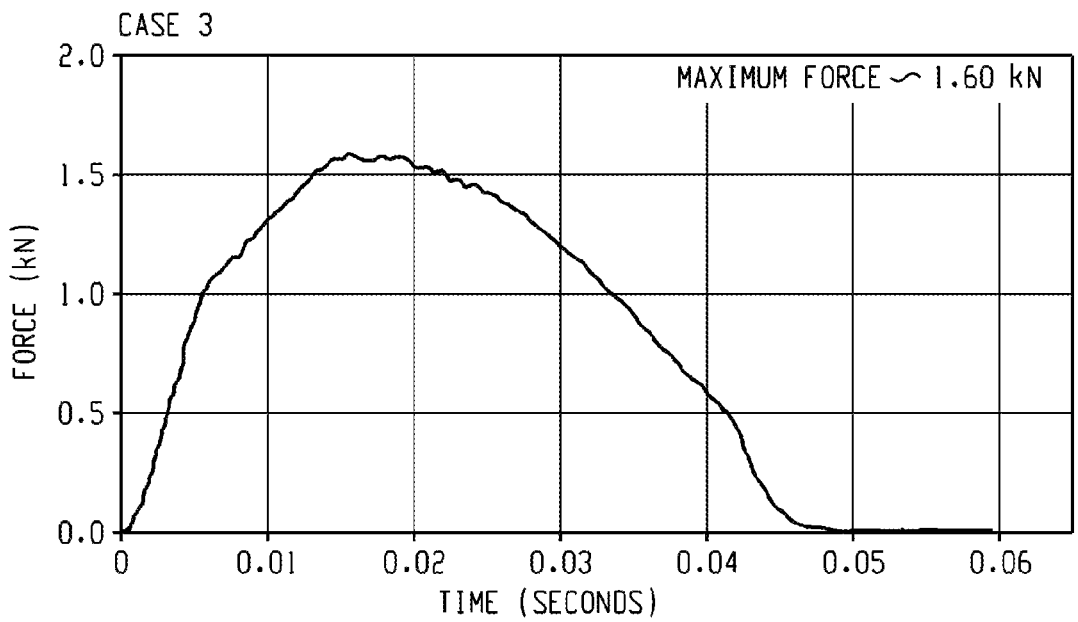
FIG. 15 is a graph showing the maximum force curve on the impactor upon impact based on the low-speed impact pendulum test of FIG. 10, without energy absorbing headlamp mounting bracket.
Figure 17:
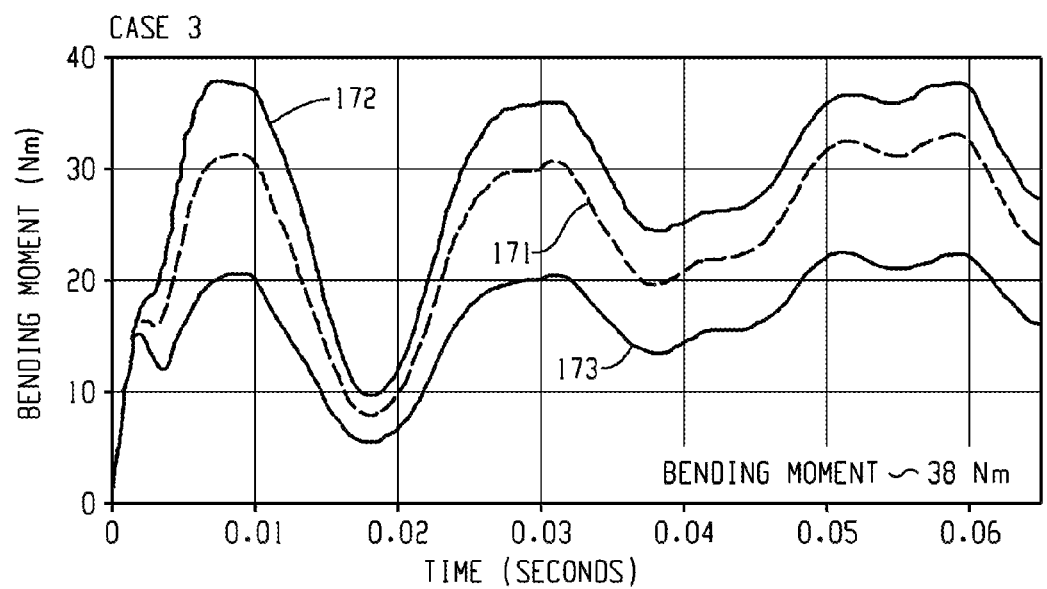
FIG. 17 is a graph showing the bending moment experienced by a headlamp comprising the energy absorbing headlamp mounting bracket upon impact based on the low-speed impact pendulum test of FIG. 10.
Figure 18:
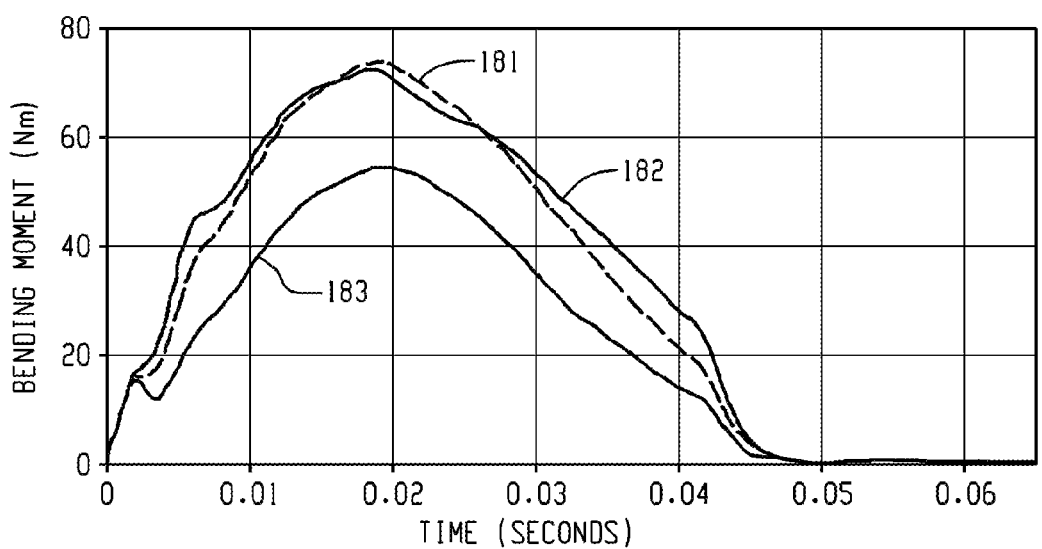
FIG. 18 is a graph showing the bending moment experienced by a headlamp without the energy absorbing headlamp mounting bracket upon impact based on the low-speed impact pendulum test of FIG. 10.

For case-2 (impact angle 37.56 degrees), FIG. 14 shows the measurement of force observed in upper leg-form with respect to time during the impact while the headlamp is connected to a vehicle body through designed energy absorbing brackets. Corresponding measurement of bending moment with respect to time, observed in upper leg-form is shown in FIG. 17. FIG. 15 and FIG. 18 show the results of Force and bending moment values if the headlamp is directly mounted on the vehicle body without using energy absorbing brackets.

TABLE 1

| Case | Force (kN)[a] EA | Force (kN)[a] No EA | Bending Moment (Nm)[b] EA | Bending Moment (Nm)[b] No EA | Stress on Cover (MPa) EA | Stress on Cover (MPa) No EA | Stress on Housing (MPa) EA | Stress on Housing (MPa) No EA | Plastic Strain on Housing (%) EA | Plastic Strain on Housing (%) No EA |
|---|---|---|---|---|---|---|---|---|---|---|
| 1 | 0.94 (10) | 1.55 (13) | 48 (x, 33) | 80.6 (z, 33) | 16.9 | 44 | 36 | 46 | 45 | 79 |
| 2 | 0.98 | 1.6 | 38 (x, 8) | 73 (z, 18) | 33 | 44 | 37 | 42 | 48 | 69 |

[a]Impact energy in all cases was ~76 J.
[b]Maximum moment observed (direction, time). Direction, time to maximum force measured in microseconds.

High efficiency of an energy absorber, given constant impact, energy can be characterized by the rate of increase in load, maximum, load exhibited and how constant is the load maintained until the impact ends. Results show (see Table 1 and FIG. 11) that when impacted at an angle of 34.7 degrees (FIG. 9), the headlamp assembly comprising the energy absorbing mounting brackets exhibits a maximum force of 0.94 kilo Newton (kN), at an intrusion time of 10 microseconds (μs), while the headlamp assembly that does not include the energy absorbing mounting bracket exhibits a maximum force of 1.55 kN, observed at 13 μs (Table 1, and FIG. 12). Likewise, when impacted at an angle of 37.56 degrees (FIG. 10), the headlamp assembly comprising the energy absorbing mounting bracket exhibits a maximum force of 0.98 kilo Newton (kN), at an intrusion time of 7 is (FIG. 14), while the headlamp assembly that does not include the energy absorbing mounting bracket exhibits a maximum force of 1.6 kN maximum, observed at 16 μs (FIG. 15). The results thus indicate a more efficient energy absorption by the headlamp including the energy absorbing mounting bracket of FIG. 7.

FIG. 13 shows the bending moment exhibited by the headlamp assembly comprising the energy absorbing mounting bracket in the z-direction (131), the x-direction (132) and the y-direction (133), when impacted at an angle of 34.7 degrees. To reiterate, the lower the bending moment in the x-direction, which represents bending perpendicular to the angle of articulation, the lower the risk for serious injury such as bone fracture, ligament rapture, and the like, to a pedestrian. As shown in FIG. 13 and Table 1, following impact at an angle of 34.7 degrees, the headlamp assembly comprising the energy absorbing mounting bracket shown in FIG. 7, exhibits a bending moment in the x (132) and z-direction (131) with maximum of ~48 Newton meter (Nm). FIG. 16 shows the bending moment exhibited by the headlamp assembly without the energy absorbing mounting unit in the z-direction (161), the x-direction (162) and the y-direction (163), when impacted at an angle of 34.7 degrees. As shown in FIG. 16, headlamps without the energy absorbing mounting bracket exhibit a maximum bending moment of 80.6 Nm in the z-direction (161) and 78 kN in the x-direction (162) at the same time.

FIG. 17 shows the bending moment exhibited by the headlamp assembly comprising the energy absorbing mounting unit in the z-direction (171), the x-direction (172) and the y-direction (173), when impacted at an angle of 37.56 degrees. FIG. 18 shows the bending moment exhibited by the headlamp assembly without the energy absorbing mounting unit in the z-direction (181), the x-direction (182) and the y-direction (183), when impacted at an angle of 37.56 degrees. As shown in FIG. 17, following impact at an angle of 37.56 degrees (FIG. 10), the headlamp assembly comprising the energy absorbing headlamp bracket shown in FIG. 7, exhibits a maximum bending moment in the x-direction (172) of ~38 Nm, built over a period of 8 μs, while the system without the energy absorbing bracket (FIG. 18) exhibits a maximum bending moment of 73.7 Nm in the z (181) and x-directions (182) over a period of 18 μs. Again, these results demonstrate that the energy absorbing mounting bracket can reduce the bending moment experienced by a pedestrian at low impact velocities, and is more effective in absorbing energy than headlamps mounted without the described energy absorbing mounting brackets.

Set forth below are some embodiments of the headlamp mounting bracket and vehicle comprising the headlamp mounting bracket.

Embodiment 1

A thermoplastic, energy absorbing headlamp mounting bracket, comprising: a frame having a proximal end and a distal end; and an energy absorbing member having a proximal end affixed to the proximal end of the frame, a distal end, and an arcuate central portion extending between the distal end and the proximal end of the energy absorbing member; wherein the proximal end of the energy absorbing member is configured to operably couple to a portion of the headlamp and the distal end of the energy absorbing member is configured to operably couple to a vehicle support component; and wherein the frame is frictionally slidable in relation to the distal end of the energy absorbing member's distal end and the support component of the vehicle.

Embodiment 2

The headlamp mounting bracket of Embodiment 1, wherein the energy absorbing member is configured to bend upon impact at the arcuate portion.

Embodiment 3

The headlamp mounting bracket of any of Embodiments 1-2, wherein the frame further comprises side plates extending between the proximal end and the distal end of the frame.

Embodiment 4

The headlamp mounting bracket of any of Embodiments 1-3, wherein the energy absorbing member further comprises side walls extending between the proximal end and the distal end of the energy absorbing member.

Embodiment 5

The headlamp mounting bracket of any of Embodiments 1-4, wherein the proximal end of the energy absorbing member is configured to operably couple to the portion of the headlamp by a snap-fit.

Embodiment 6

The headlamp mounting bracket of any of Embodiments 1-5, wherein the length of the frame from the proximal end to the distal end is 30 to 140 mm, the width of the frame is 10 to 80 mm and the thickness of the frame is 1.0 to 6.0 mm.

Embodiment 7

The headlamp mounting bracket of Embodiment 6, wherein the length of the frame from the proximal end to the distal end is about 20 to about 100 mm, the width of the frame is 15 to 50 mm and the thickness of the frame is about 1.5 to about 3.5 mm.

Embodiment 8

The headlamp mounting bracket of any of Embodiments 1-7, wherein the thickness of the arcuate central portion of the energy absorbing member is 1.0 to 6.0 mm.

Embodiment 9

The headlamp mounting bracket of Embodiment 8, wherein the thickness of the energy absorbing member is about 1.5 to about 4.75 mm.

Embodiment 10

The headlamp mounting bracket of any of Embodiments 1-9, wherein the frame comprises side panels having a thickness of 1.0 to 6.0 mm.

Embodiment 11

The headlamp mounting bracket of Embodiment 10, wherein the side panel thickness is 1.5 to 5.0 mm.

Embodiment 12

The headlamp mounting bracket of any of Embodiments 1-11, wherein the height of the arcuate portion at the center above the frame is 1 to 20 mm.

Embodiment 13

The headlamp mounting bracket of any of Embodiments 1-12, wherein the arcuate portion defines an arc having a radius of 10 to 300 mm.

Embodiment 14

The headlamp mounting bracket of any of Embodiments 1-13, wherein the frame and the energy absorbing member are molded or formed as a unitary body.

Embodiment 15

The headlamp mounting bracket of any of Embodiments 1-14, wherein the energy absorbing member has a Young's modulus of 0.7 to 8.0 GPa.

Embodiment 16

The headlamp mounting bracket of any of Embodiments 1-15, wherein the arcuate central portion comprises at least one rectangular slit.

Embodiment 17

The headlamp mounting bracket of any of Embodiments 1-16, wherein the arcuate central portion comprises four rectangular slits.

Embodiment 18

The headlamp mounting bracket of any of Embodiments 1-17, wherein the distal end of the energy absorbing member comprises portions extending laterally at least partially over the distal end of the frame.

Embodiment 19

A headlamp assembly comprising the headlamp mounting bracket of any of Embodiments 1-18.

Embodiment 20

A vehicle comprising: a headlamp; and a thermoplastic, energy absorbing headlamp mounting bracket of any of Embodiments 1-18.

Embodiment 21

The vehicle of Embodiment 20, wherein an impact with a 9.5 kg impactor at a 34.7 degree angle and at a speed of 4.014 m/s yields a maximum force equal to or less than 1.5 kN, a bending moment equal to or less than 80 Nm and kinetic energy equal to or less than 80 J, when the mounting bracket is fixed to the support component of the vehicle only at the distal end of the energy absorbing member.

Embodiment 22

The vehicle of any of Embodiments 20-21, wherein an impact with a 9.5 kg impactor at a 37.6 degree angle and at a speed of 4.014 m/s yields a maximum force equal to or less than 1.6 kN, a bending moment equal to or less than 70 Nm and kinetic energy equal to or less than 75 J, when the mounting bracket is fixed to the support component of the vehicle only at the distal end of the energy absorbing member.

Embodiment 23

The vehicle of any of Embodiments 20-22, wherein the headlamp is coupled to the support component of the vehicle by three energy absorbing mounting brackets disposed in a triangular configuration with the vertex at the top portion of the headlamp.

Embodiment 24

The vehicle of any of Embodiments 20-23, wherein the energy absorbing mounting bracket is removably attached to the headlamp, to the support component of the vehicle, or both the headlamp and the support component of the vehicle.

Embodiment 25

The vehicle of any of Embodiments 20-24, wherein the proximal end of the energy absorbing member is coupled to the portion of the headlamp by a snap-fit.

Embodiment 26

The vehicle of any of Embodiments 20-25, wherein the energy absorbing member is coupled to the support component of the vehicle by a threaded bolt at a torque of 70 to 160 Nm.

Embodiment 27

The vehicle of any of Embodiments 20-26, wherein the energy absorbing member is coupled to a headlamp housing arm.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25%, or, more specifically, 5% to 20%" is inclusive of the endpoints and all intermediate values of the ranges of "5% to 25%," etc.). "Combination" is inclusive of blends, mixtures, alloys, reaction products, and the like. Furthermore, the terms "first," "second," and the like, herein do not denote any order, quantity, or importance, but rather are used to one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic, energy absorbing headlamp mounting bracket, comprising:
    a frame having a proximal end and a distal end; and
    an energy absorbing member having a proximal end affixed to the proximal end of the frame, a distal end, and an arcuate central portion extending between the distal end and the proximal end of the energy absorbing member;
    wherein the proximal end of the energy absorbing member is configured to operably couple to a portion of the headlamp and the distal end of the energy absorbing member is configured to operably couple to a vehicle support component; and
    wherein the frame is frictionally slidable in relation to the distal end of the energy absorbing member's distal end and the support component of the vehicle.

2. The headlamp mounting bracket of claim 1, wherein the energy absorbing member is configured to bend upon impact at the arcuate portion.

3. The headlamp mounting bracket of claim 1, wherein the frame further comprises side plates extending between the proximal end and the distal end of the frame.

4. The headlamp mounting bracket of claim 1, wherein the energy absorbing member further comprises side walls extending between the proximal end and the distal end of the energy absorbing member.

5. The headlamp mounting bracket of claim 1, wherein the proximal end of the energy absorbing member is configured to operably couple to the portion of the headlamp by a snap-fit.

6. The headlamp mounting bracket of claim 1, wherein the length of the frame from the proximal end to the distal end is 30 to 140 mm, the width of the frame is 10 to 80 mm and the thickness of the frame is 1.0 to 6.0 mm.

7. The headlamp mounting bracket of claim 1, wherein the thickness of the arcuate central portion of the energy absorbing member is 1.0 to 6.0 mm.

8. The headlamp mounting bracket of claim 1, wherein the frame comprises side panels having a thickness of 1.0 to 6.0 mm.

9. The headlamp mounting bracket of claim 1, wherein the height of the arcuate portion at the center above the frame is 1 to 20 mm.

10. The headlamp mounting bracket of claim 1, wherein the arcuate portion defines an arc having a radius of 10 to 300 mm.

11. The headlamp mounting bracket of claim 1, wherein the frame and the energy absorbing member are molded or formed as a unitary body.

12. The headlamp mounting bracket of claim 1, wherein the energy absorbing member has a Young's modulus of 0.7 to 8.0 GPa.

13. The headlamp mounting bracket of claim 1, wherein the arcuate central portion comprises at least one rectangular slit.

14. The headlamp mounting bracket of claim 13, wherein the arcuate central portion comprises four rectangular slits.

15. The headlamp mounting bracket of claim 1, wherein the distal end of the energy absorbing member comprises portions extending laterally at least partially over the distal end of the frame.

16. A headlamp assembly comprising the headlamp mounting bracket of claim 1.

17. A vehicle comprising:
    a headlamp; and
    a thermoplastic, energy absorbing headlamp mounting bracket, the bracket comprising
        a frame having a proximal end and a distal end; and
        an energy absorbing member having a proximal end affixed to the proximal end of the frame, a distal end having portions extending to the side at least partially over the distal end of the frame, and an arcuate central portion extending between the distal end and the proximal end of the energy absorbing member, wherein the proximal end of the energy absorbing member is coupled to a portion of the headlamp and the distal end of the energy absorbing member is coupled to a vehicle support component, and wherein the frame is frictionally slidable in relation to the distal end of the energy absorbing member and the support component of the vehicle.

18. The vehicle of claim 17, wherein an impact with a 9.5 kg impactor at a 34.7 degree angle and at a speed of 4.014 m/s yields a maximum force equal to or less than 1.5 kN, a bending moment equal to or less than 80 Nm and kinetic energy equal to or less than 80 J, when the mounting bracket is fixed to the support component of the vehicle only at the distal end of the energy absorbing member.

19. The vehicle of claim 17, wherein an impact with a 9.5 kg impactor at a 37.6 degree angle and at a speed of 4.014 m/s yields a maximum force equal to or less than 1.6 kN, a bending moment equal to or less than 70 Nm and kinetic energy equal to or less than 75 J, when the mounting bracket is fixed to the support component of the vehicle only at the distal end of the energy absorbing member.

20. The vehicle of claim 17, wherein the headlamp is coupled to the support component of the vehicle by three energy absorbing mounting brackets disposed in a triangular configuration with the vertex at the top portion of the headlamp.

21. The vehicle of claim 17, wherein the energy absorbing mounting bracket is removably attached to the headlamp, to the support component of the vehicle, or both the headlamp and the support component of the vehicle.

22. The vehicle of claim 21, wherein the proximal end of the energy absorbing member is coupled to the portion of the headlamp by a snap-fit.

23. The vehicle of claim 17, wherein the energy absorbing member is coupled to the support component of the vehicle by a threaded bolt at a torque of 70 to 160 Nm.

24. The vehicle of claim 17, wherein the energy absorbing member is coupled to a headlamp housing arm.

* * * * *